United States Patent
Narubin

(10) Patent No.: US 10,831,397 B2
(45) Date of Patent: Nov. 10, 2020

(54) STATEFUL RELOCATOR FOR A DISTRIBUTED STORAGE NETWORK

(71) Applicant: International Business Machines Corporation, Armonk, NY (US)

(72) Inventor: Renars W. Narubin, San Francisco, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 85 days.

(21) Appl. No.: 16/351,908

(22) Filed: Mar. 13, 2019

(65) Prior Publication Data

US 2020/0293214 A1    Sep. 17, 2020

(51) Int. Cl.
   G06F 12/00    (2006.01)
   G06F 3/06     (2006.01)
   H04L 29/08    (2006.01)
   G06F 11/10    (2006.01)

(52) U.S. Cl.
   CPC .......... *G06F 3/0647* (2013.01); *G06F 3/0604* (2013.01); *G06F 3/067* (2013.01); *G06F 11/1076* (2013.01); *H04L 67/1097* (2013.01)

(58) Field of Classification Search
   CPC ...... G06F 3/0647; G06F 3/0604; G06F 3/067; G06F 11/1076
   See application file for complete search history.

(56) References Cited

U.S. PATENT DOCUMENTS

| | | | |
|---|---|---|---|
| 8,429,346 B1 | 4/2013 | Chen et al. | |
| 9,619,169 B1 | 4/2017 | Throop et al. | |
| 9,817,766 B1 | 11/2017 | Si et al. | |
| 2014/0325260 A1 | 10/2014 | Gladwin et al. | |
| 2017/0168720 A1* | 6/2017 | Kazi | G06F 11/1076 |

* cited by examiner

*Primary Examiner* — Gurtej Bansal
(74) *Attorney, Agent, or Firm* — James Nock; Andrew D. Wright; Roberts Calderon Safran & Cole, P.C.

(57) ABSTRACT

A method includes a storage unit (SU) of a dispersed storage network (DSN) receiving and storing a first modification for an encoded data slice (EDS) associated with the SU and assigning an identifier for the first modification. The method continues with the SU receiving and storing a second modification for the EDS and assigning an identifier for the second modification. The method continues with the SU receiving a request to relocate the EDS to another SU of the DSN. The method continues with the SU transmitting the EDS to the another SU of the DSN, followed by transmitting the first modification for the EDS and the identifier to the another SU of the DSN in a first message. The method continues with the SU transmitting the second modification with the identifier for the second modification to the another SU of the DSN in a second message, where the second message is separate from the first message.

19 Claims, 9 Drawing Sheets

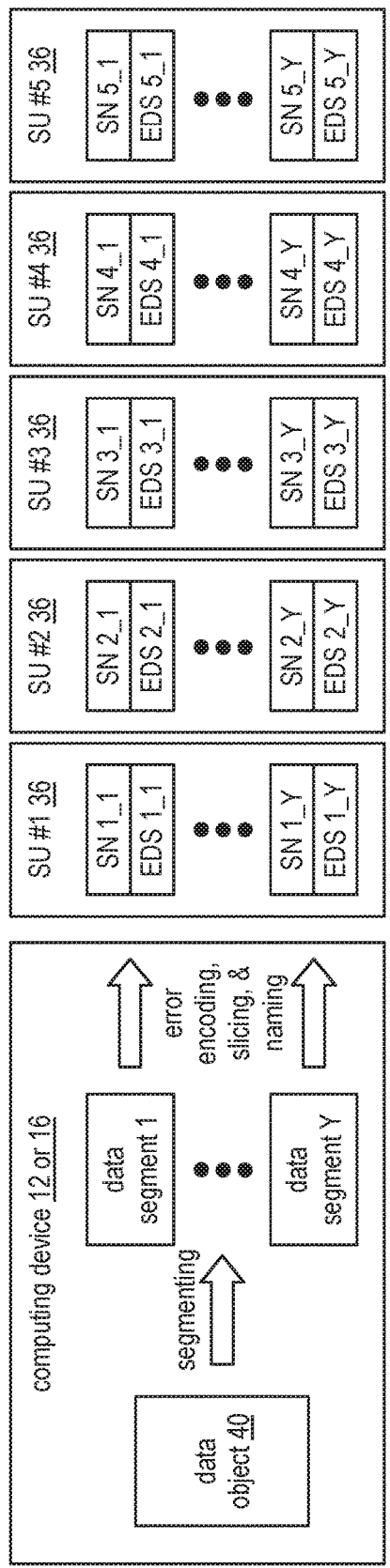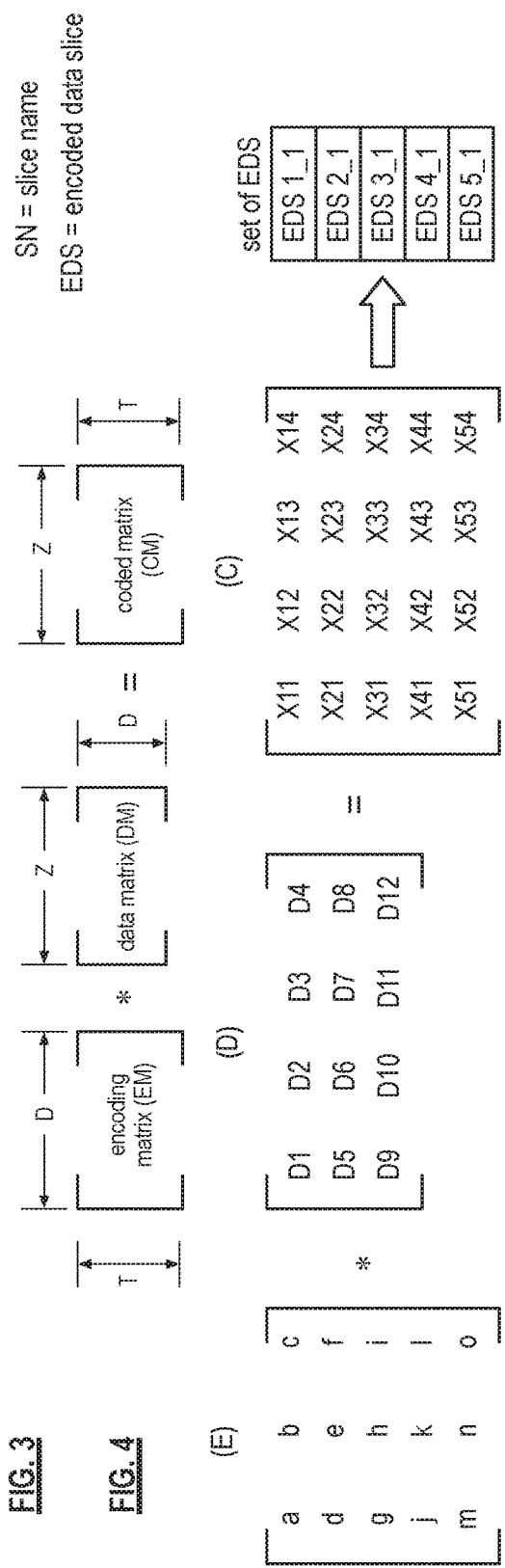

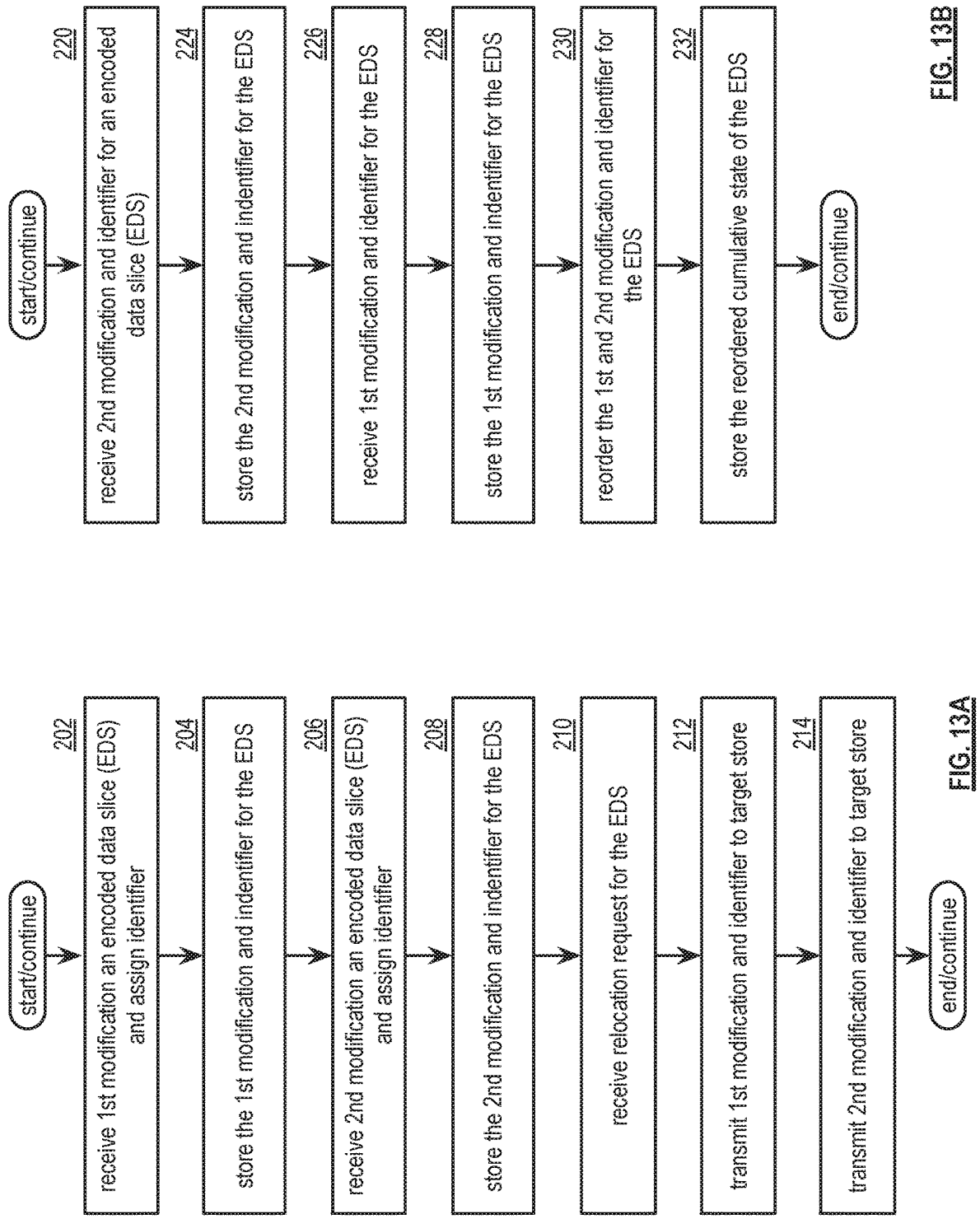

US 10,831,397 B2

STATEFUL RELOCATOR FOR A DISTRIBUTED STORAGE NETWORK

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

Distributed storage systems are known to utilize protocol operations to modify the state of data elements over time. These systems are also known to use relocation operations to relocate data elements as needed for maintenance operations. Processing data elements can be dependent on the cumulative state of a given data element.

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

FIG. 13A is a logic diagram of an example of a method relocating state information during relocation in accordance with the present invention; and FIG. 13B is a logic diagram of an example of a method of reordering state information during relocation in accordance with the present invention.

DETAILED DESCRIPTION OF THE INVENTION

Figure 1:
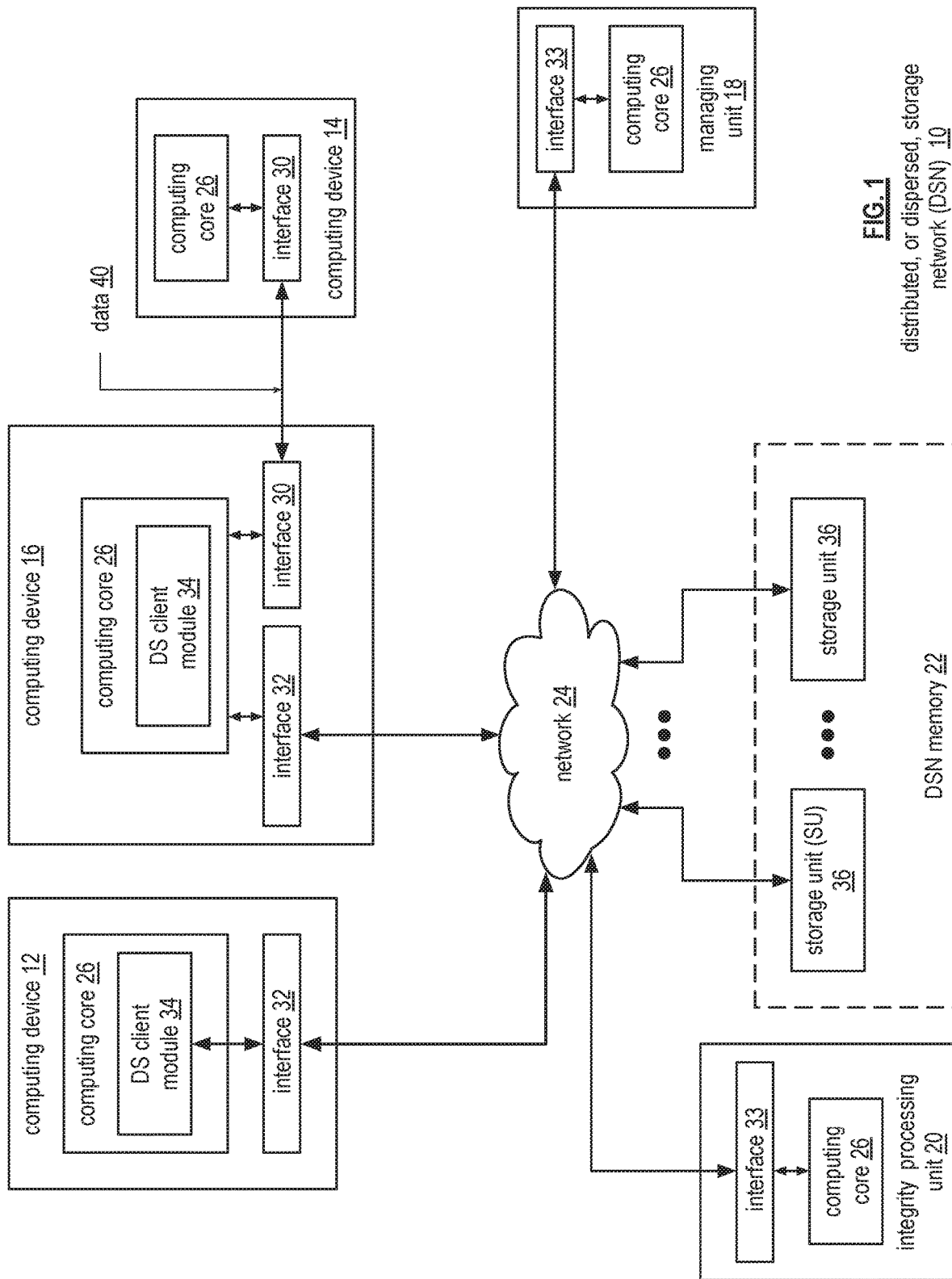
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
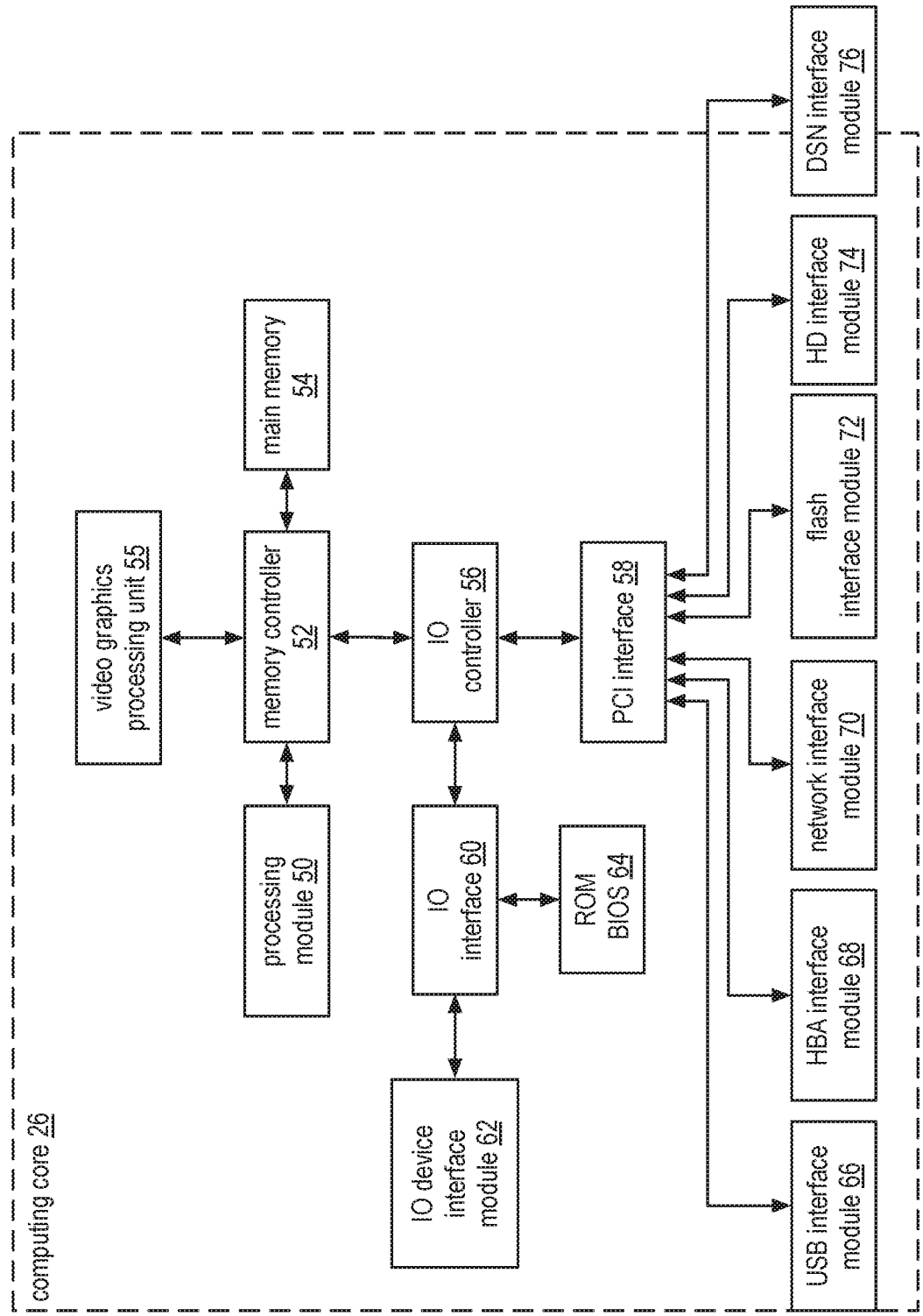
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 and 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data (e.g., data 40) as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The managing unit 18 creates billing information for a particular user, a user group, a vault access, public vault access, etc. For instance, the managing unit 18 tracks the number of times a user accesses a non-public vault and/or public vaults, which can be used to generate a per-access billing information. In another instance, the managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment (i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 80 is shown in FIG. 6. As shown, the slice name (SN) 80 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figure 7:
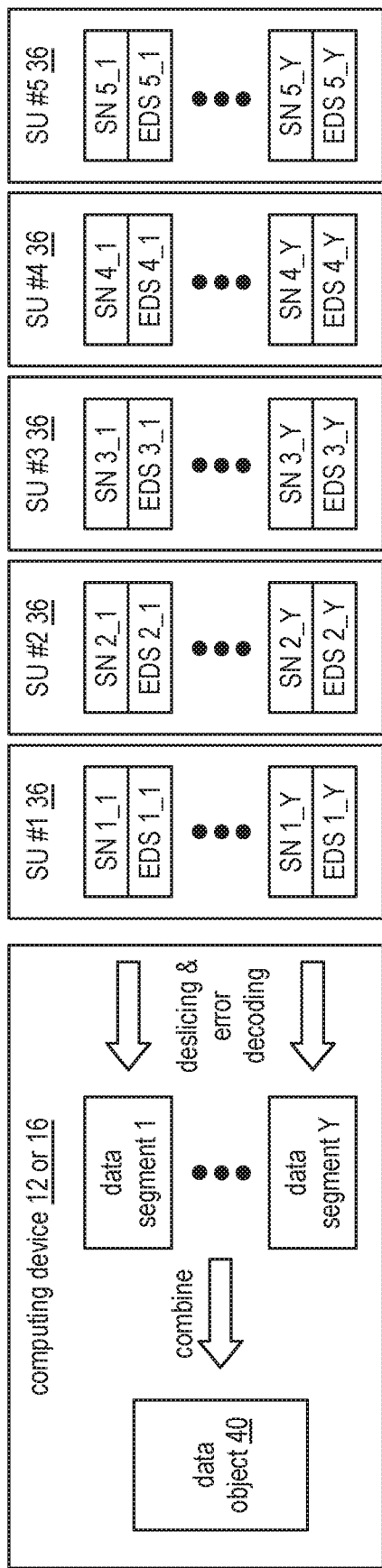
FIG. 7 is a schematic block diagram of an example of dispersed storage error decoding of data in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

Figure 8:
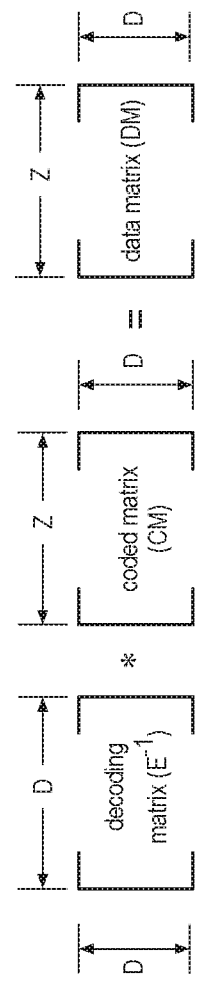
FIG. 8 is a schematic block diagram of a generic example of an error decoding function in accordance with the present invention.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

The DSN protocol enables single-element atomic "compare and swap of 1 element" (CAS-1), where a data source may be atomically incremented in an atomic transactional operation. Supporting multiple (arbitrary N) atomic compare and swap (CAS-N) transactions requires extensions to the DSN protocol, which are accomplished by using the protocol to enable N-Element compare and swap (CAS-N). CAS-N provides strong consistency among arbitrary elements with atomic read visibility. A CAS-N transaction consists of a set of "proposals" which take the form (SOURCE, OLD REVISION, NEW REVISION), where each proposal's revision comparisons must be atomically satisfied in order for the transaction to complete, and if any fail no update to any source is made. This is accomplished by storing the complete "transaction description"—(the set of all proposals) in each data location (for example, on each participating ds unit holding a slice of at least one of the sources within the CAS-N operation) at least for the duration the transaction. Any reader or writer that encounters a source with an ongoing (open) transaction must then validate the entire transaction's proposals before deciding whether the NEW REVISION or OLD REVISION is visible for that source. In some cases, this may require a client to issue additional read requests for previously unknown sources that are referenced within the transaction description. When a CAS-N transaction is complete, the transaction description can be removed from all participating ds units, and at such time the NEW REVISION of each source is visible.

Figure 9:
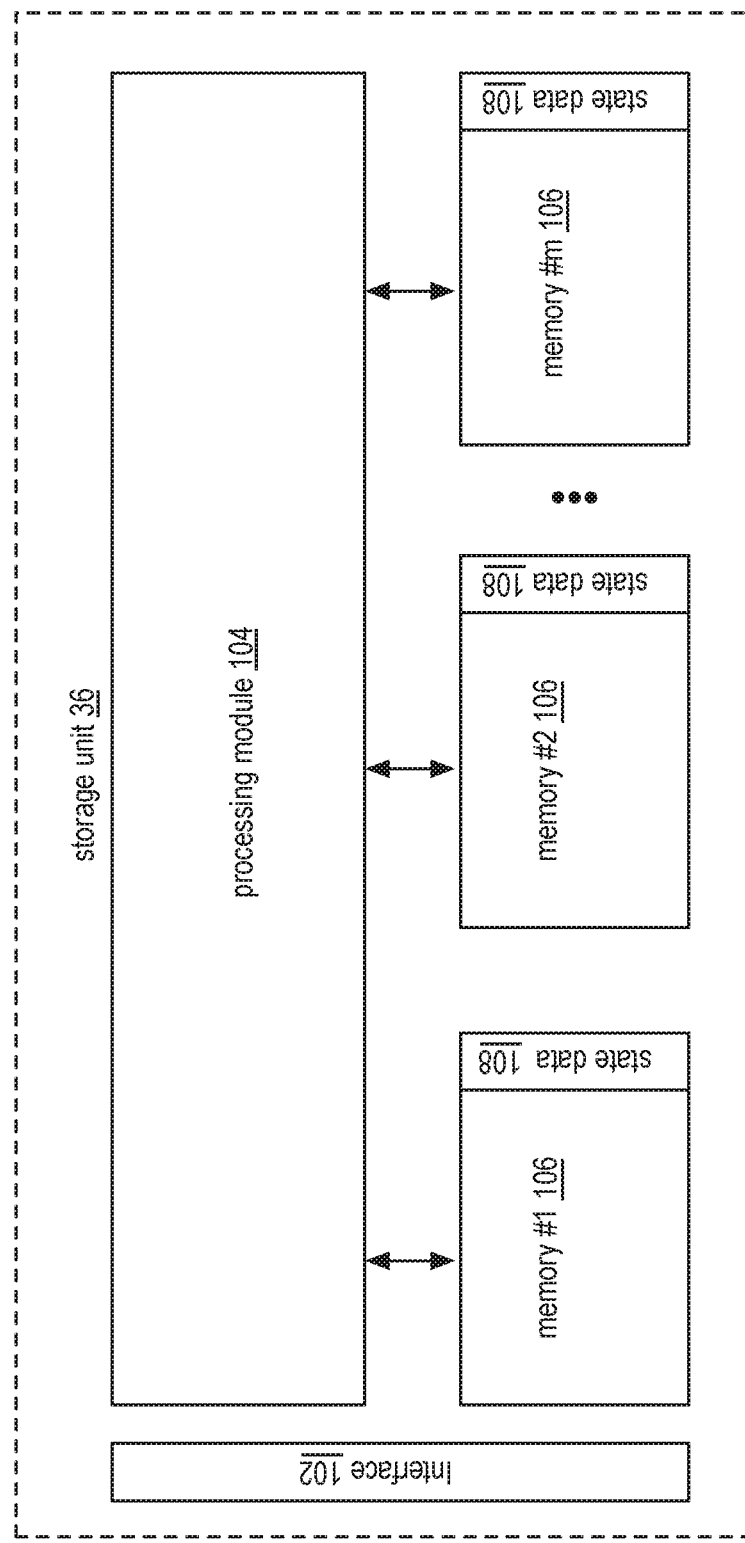
FIG. 9 is a schematic block diagram of an embodiment of a DSN storage unit in accordance with the present invention.

FIG. 9 is a schematic block diagram of an embodiment of a DSN storage unit 36 including interface 102, memory 106#1-#m, and state data 108. When distributed storage (DS) processing units transmit access requests to distributed storage units (SUs) units using the CAS-N protocol the DS processing unit can use one or more of a "propose", "promote" or "cleanup" operations to modify the present state of a given EDS on a distributed storage unit (SU). As modifications are received by storage unit 36 they are stored in the order received so as to be accessible by 36 storage unit. The manner of processing modifications to a given EDS can depend on the state determined by one or more modifications received previously (historically) by a SU. The processing modifications can, in turn, affect future modifications sent using the CAS-N protocol, which operates in a repeating manner as CAS-N compatible operations are received in a cumulative state of modifications on the SU. Had cumulative modifications been received in a different sequence the processing would, accordingly, be changed to some extent.

Figure 10:
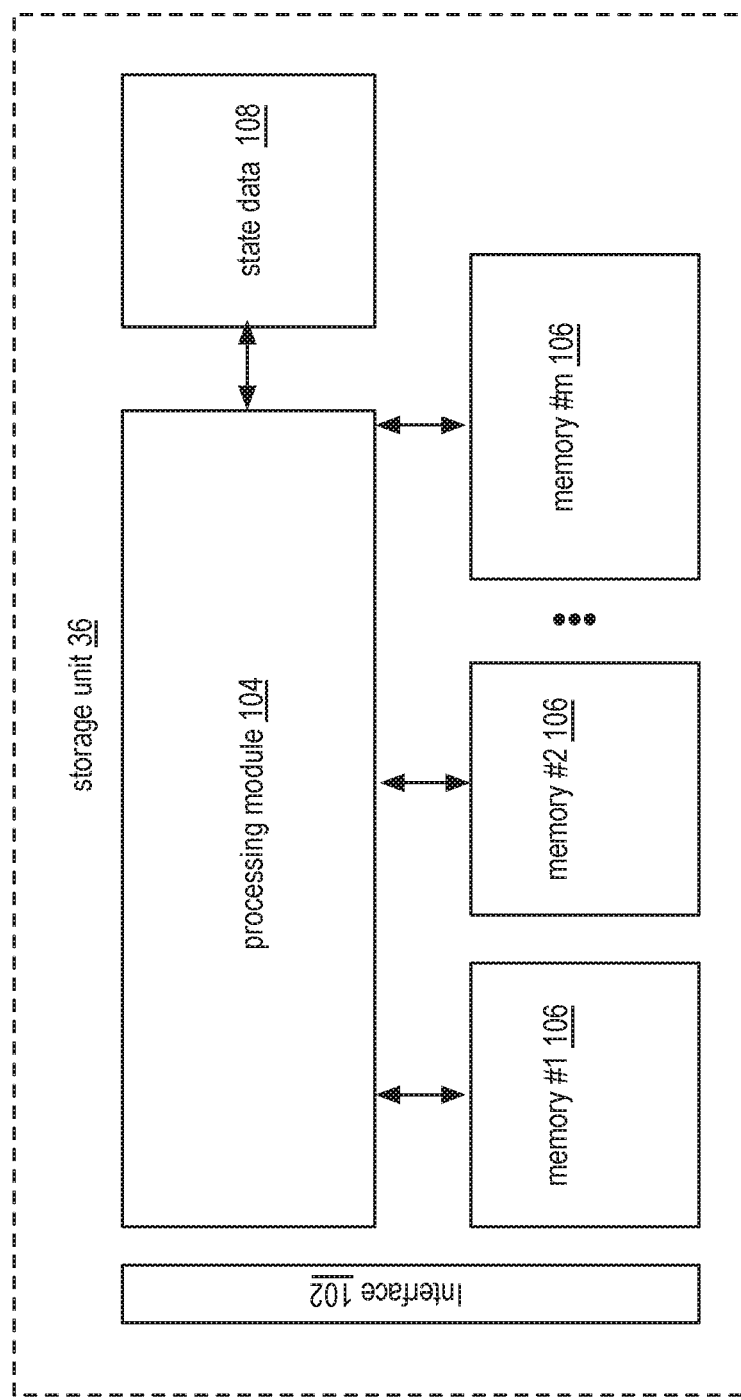
FIG. 10 is a schematic block diagram of an example of dispersed error encoded data slices and modification identifiers in a DSN memory in accordance with the present invention.

State data 108 can be stored in close proximity to memory 106; in an example, state data 108 is stored on the same memory 106 where the EDS is located. In another example state data 108 is stored in another location practical for access by processing module 104 of storage unit 36. FIG. 10 is a schematic block diagram of another embodiment of a DSN storage unit 36 including interface 102, processing module 104, memory 106#1-#m, and state data 108, where state data 108 is accessible by processing module 104, but is not part of memory 36. In an embodiment, state 108 is located in one of memory #1-#n with metadata associated with a related EDS, or in another embodiment state data 108 is stored in a dedicated memory element.

Figure 11:
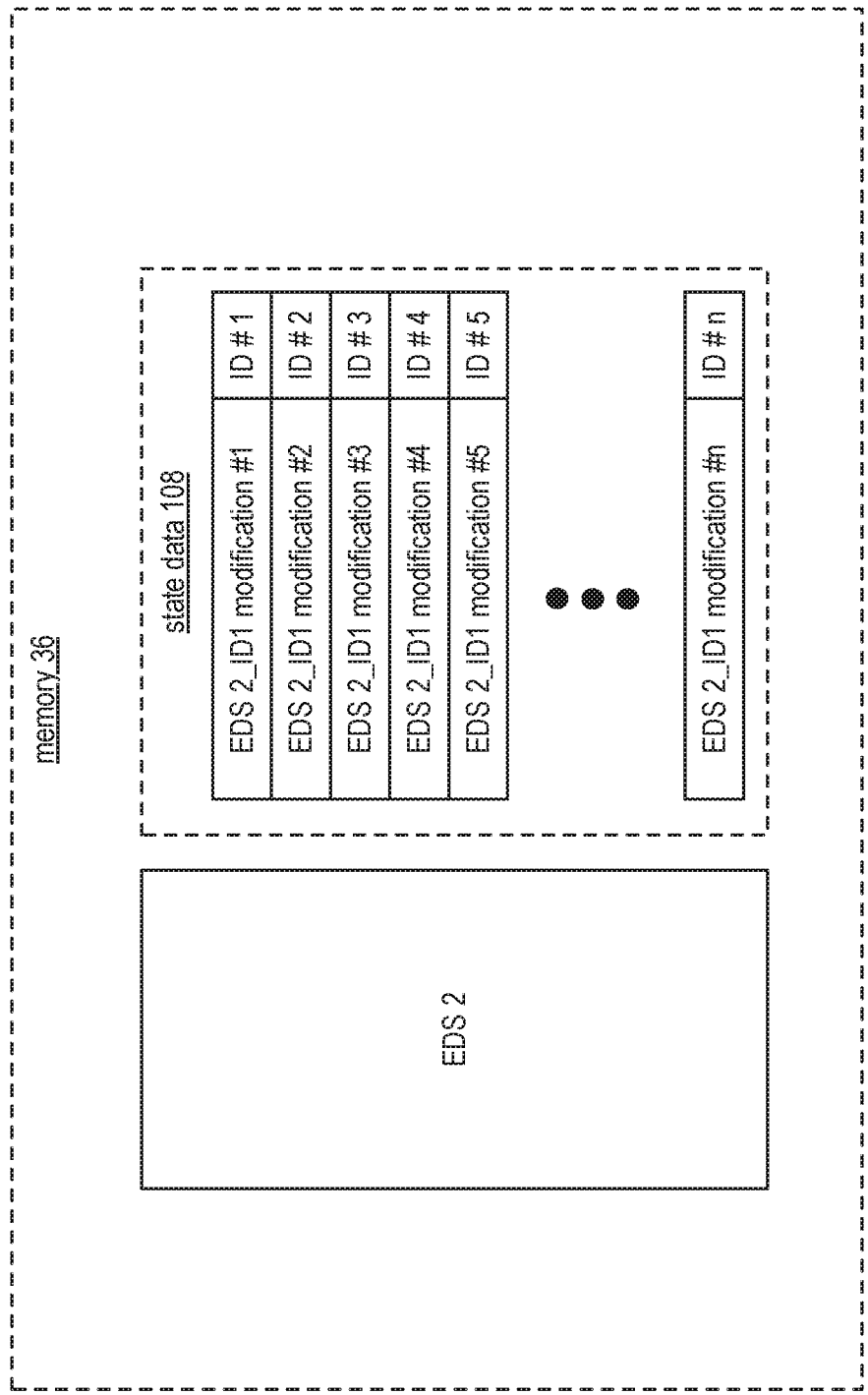
FIG. 11 is a schematic block diagram of an example of dispersed error encoded data slices, modifications and modification identifiers in a memory device in accordance with the present invention.

FIG. 11 is a schematic block diagram of an example of dispersed error encoded data slices, modifications and modification identifiers in a memory device 36. Memory device 36 includes a plurality of EDSs, each with associated state data 108. In an example, EDS 2 is associated with state data 108, which includes a plurality of modifications, EDS 2_ID1 modification #1 to EDS 2_ID1 modification #n, with each of modifications EDS 2_ID1 modification #1 to EDS 2_ID1 modification #n being associated with a respective identification ID #1 to ID #n, respectively. Each successive modification of EDS 2 is stored as state data 108, such that state data 108 includes the cumulative state of modifications for EDS 2, in the order received. EDS 2 can be modified n # of times, each of which are stored as state data 108.

Figure 12:
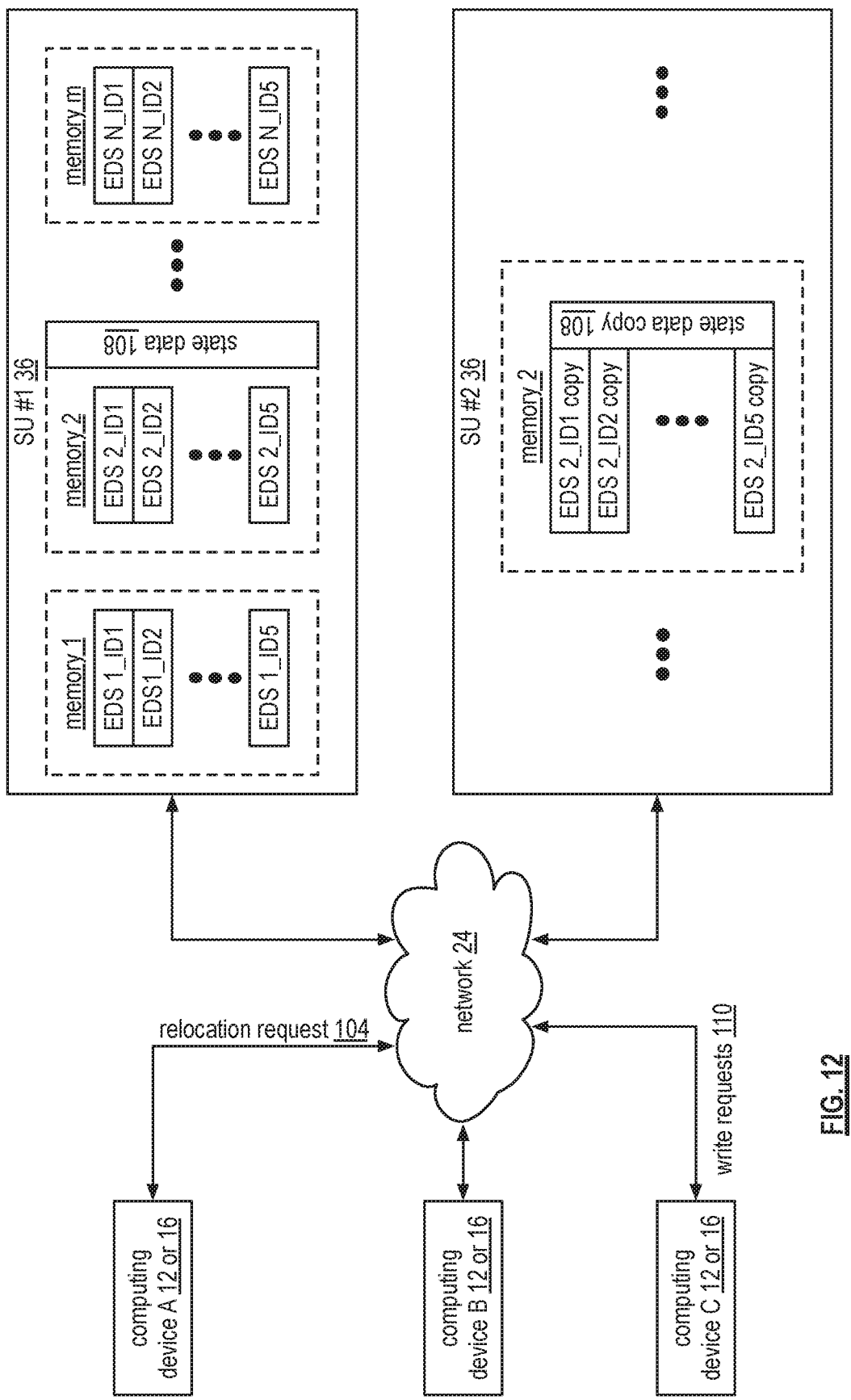
FIG. 12 is a schematic block diagram of an example of processing a relocation request in accordance with the present invention.

FIG. 12 is a schematic block diagram of an example of processing a relocation request. In the course of executing internal maintenance of DSN memory it may become advantageous to relocate one or more EDSs from one SU to another SU in the DSN. It is usually advisable that the state of any EDSs relocated from a source SU to a destination SU maintain the state of the EDSs such that a DS processing unit can continue to operate storage functions associated with the EDSs transparently with the destination SU. Accordingly, after relocation is complete the start state of the destination SU should be indistinguishable from the end state of the source SU. State data 108 can be prohibitively large, and therefore difficult to transmit in a single message when a given EDS is relocated to a destination SU. In order to partition state data 108 into manageable portions, in an example a DS processing unit can generate a unique identifier, such as ID #s 1-n, to each successive modification to a given EDS, such as EDS 2 illustrated in FIG. 11. In an alternative example a unique identifier is assigned and/or generated by the SU as a modification to a particular EDS is received. The unique identifier is stored the associated modification can be stored with metadata for the EDS. In another example, the identifier is generated by the DS processing unit responsible for transmitting the modification request and in yet another example the identifier is generated by the SU responsible for storing a modification and the associated EDS.

In an example, when modifications depend on a past state in a same SU the identifier can be generated by incrementing a simple counter as modifications are received. In another example the first modification can be an arbitrary number, with successive modifications being assigned every higher numbers. In yet another example, modifications can depend on a state that exists on other SUs in the DSN and the identifier can be generated using, for example, a distributed clock, or a counter algorithm.

FIG. 13A is a logic diagram of an example of a method relocating state information during relocation. At step 202 a $1^{st}$ modification to an encoded data slice (EDS) is received at an SU, which generates and assigns an identifier for the modification. In an alternative embodiment the identifier is generated at by a DS processor responsible for the modification, both of which are received at the SU. At step 204 the SU stores the modification and the generated identifier with metadata associated with the EDS. In another embodiment the modification and identifier is stored separately from the metadata associated with the EDS. At step 206 the SU a $2^{nd}$ modification to the encoded data slice (EDS) is received at the SU, which generates and assigns an identifier for the $2^{nd}$ modification. As above, in an alternative embodiment the identifier is generated at by a DS processor responsible for the modification, both of which are received at the SU. At step 208 the SU stores the $2^{nd}$ modification and associated identifier to the store associated with the $1^{st}$ modification and its associated identifier. It is understood that successive modifications can be received at the SU, which in turn can generate/assign associated identifiers, all of which can be stored as received in memory.

The method continues at step 210 with the SU receiving a relocation request from another DSN entity, to relocate the EDS to another SU associated with the DSN. The another DSN entity can be, for example, a DSN user, a DSN management unit and/or an automated DSN management unit assigned to manage DSN resources. At step 212 the SU (now the source SU) transmits a message including the $1^{st}$ modification and identifier to the destination SU identified in the relocation request. At step 214 with the SU transmits a message including the $2^{nd}$ modification and its associated identifier to the destination SU identified in the relocation request. Implicit in the method is the understanding that successive modifications and their associated identifiers, are transmitted as separate messages to the destination SU. In an alternative example the SU can transmit a plurality of messages, each including a plurality of modifications with their associated identifiers as desired to achieve network performance objectives.

FIG. 13B is a logic diagram of an example method of reordering state information during a relocation operation. Transmitting each modification with its associated identifier as a separate message enables the DSN to improve performance by transmitting a plurality of messages in parallel while maintaining the cumulative state information associate with the EDS. For example, when a plurality of messages are transmitted substantially in parallel to the destination SU, one or more messages will be received at the destination SU in a different order than received at the source SU. Using the identifier the destination SU can reorder the cumulative state information to mirror the source SU, thereby preserving the cumulative state information at the destination SU. At step 220 a destination SU receives a message (in this case the $2^{nd}$ modification from FIG. 13A) that includes one of the modifications with its associated identifier from the source SU. In an example, a message is received in a different order than it was transmitted from the source SU.

Alternatively, network performance issues and/or source performance issues result in one or more modifications and their associated identifiers being transmitted out of order from the order they were received at the source SU. At step 224 the destination SU stores the $2^{nd}$ modification and its identifier and the method continues at step 226, where the destination SU receives a message that includes a modification and its identifier that is in a different order than it was stored at the source SU (in this case the 1st modification from FIG. 13A). The destination SU stores the now "out of order" modification and its identifier at step 228, and at step 230 the destination SU can use the identifiers for the out of order modifications to reorder the received modifications to reflect the order they were stored in the source SU. At step 232 the destination SU can then store the reordered modifications to mirror the cumulative state information for the EDS stored at the source SU prior to the relocation of the EDS.

It should be understood that the method of FIG. 13B and its alternative embodiments are applicable for a $3^{rd}$, $4^{th}$ and nth modification transmitted from the source SU to the destination SU. In this way the entirety of state information associated with a given EDS can be mirrored transparently to one or more destination SUs, such that a DS processor can transparently execute DSN functions at the destination SU without substantial performance issues.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provides an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by a storage unit of a dispersed storage network (DSN), the method comprises:
   receiving, from one or more processing modules of one or more computing devices of the DSN, a first modification for an encoded data slice (EDS) associated with the storage unit;
   assigning an identifier for the first modification for the EDS;

storing, by the storage unit, the first modification, and the identifier for the first modification;

receiving, from the one or more processing modules of one or more computing devices of the DSN, a second modification for the EDS associated with the storage unit;

assigning an identifier for the second modification for the EDS;

storing, by the storage unit, the second modification, and the identifier for the second modification;

receiving, from the one or more processing modules of one or more computing devices of the DSN, a request to relocate the EDS to another storage unit of the DSN;

transmitting, by the storage unit, the EDS to the another storage unit of the DSN;

transmitting, by the storage unit, the first modification for the EDS with the identifier for the first modification to the another storage unit of the DSN, wherein the first modification with the identifier for the first modification is transmitted in a first message; and transmitting, by the storage unit, the second modification with the identifier for the second modification to the another storage unit of the DSN, wherein the second modification with the identifier for the second modification is transmitted in a second message and wherein the second message is separate from the first message.

2. The method of claim 1, wherein each of the identifier for the first modification and the identifier for the second modification is a unique character.

3. The method of claim 1, wherein each of the identifier for the first modification and the identifier for the second modification is generated by at least one of a clock and a counter algorithm.

4. The method of claim 1, wherein each of the identifier for the first modification and the identifier for the second modification is numeric and further wherein the identifier for the second modification is greater than the identifier for the first modification.

5. The method of claim 1, further comprising:

receiving, from the one or more processing modules of one or more computing devices of the DSN, an nth modification for the EDS associated with the storage unit, wherein the nth modification for the EDS includes an identifier for the nth modification for the EDS, further wherein the nth modification is the last of a plurality of modifications associated with the EDS received by the storage unit;

storing, by the storage unit, the nth modification, and the identifier for the nth modification; and transmitting, by the storage unit, the nth modification and the identifier for the nth modification to the another storage unit of the DSN, wherein the nth modification is transmitted in a separate message from both the first modification and the second modification.

6. The method of claim 1, wherein the another storage unit is adapted to receive the second message after the first message, wherein the another storage unit of the DSN is further adapted for reordering the second modification and the first modification based on the identifier for the first modification and the identifier for the second modification wherein the reordering the second modification and the first modification substantially restores an order of the second modification and the first modification substantially as it was received at the storage unit.

7. The method of claim 1, wherein the transmitting the first modification and the transmitting the second modification is executed substantially in parallel.

8. The method of claim 1, wherein the another storage unit is adapted for reordering the second modification and the first modification to restore an order of the second modification and the first modification substantially as it was received at the storage unit.

9. The method of claim 1, wherein at least one of the first modification and the second modification is in accordance with a protocol that specifies an N-Element compare and swap (CAS-N) operation.

10. The method of claim 9, wherein the CAS-N operation is at least one of propose, promote and cleanup.

11. The method of claim 9, wherein the CAS-N operation comprises changing a state of the EDS from a first state to a second state.

12. A storage unit of a distributed storage network (DSN) comprising:

an interface configured to interface and communicate with a communication system;

memory that stores operational instructions; and processing circuitry operably coupled to the interface and to the memory, wherein the processing circuitry is configured to execute the operational instructions to:

receive a first modification for an encoded data slice (EDS) associated with the storage unit;

assign an identifier for the first modification for the EDS;

store the first modification, and the identifier for the first modification;

receive a second modification for the EDS associated with the storage unit, wherein the second modification for the EDS includes an identifier for the second modification for the EDS;

store the second modification, and the identifier for the second modification;

receive a request to relocate the EDS to another storage unit of the DSN;

transmit the EDS to the another storage unit of the DSN;

transmit the first modification for the EDS with the identifier for the first modification to the another storage unit of the DSN, wherein the first modification with the identifier for the first modification is transmitted in a first message; and transmit the second modification with the identifier for the second modification to the another storage unit of the DSN, wherein the second modification with the identifier for the second modification is transmitted in a second message and wherein the second message is separate from the first message.

13. The storage unit of claim 12, wherein each of the identifier for the first modification and the identifier for the second modification is a unique character.

14. The storage unit of claim 12, wherein each of the identifier for the first modification and the identifier for the second modification is generated by at least one of a clock and a counter algorithm.

15. The storage unit of claim 12, wherein each of the identifier for the first modification and the identifier for the second modification is numeric and further wherein the identifier for the second modification is greater than the identifier for the first modification.

16. The storage unit of claim 12, wherein the processing circuitry is further configured to execute the operational instructions to:

receive an nth modification for the EDS associated with the storage unit, wherein the nth modification for the EDS includes an identifier for the nth modification for the EDS, further wherein the nth modification is the last of a plurality of modifications associated with the EDS received by the storage unit;

store the nth modification, and the identifier for the nth modification; and transmit the nth modification and the identifier for the nth modification to the another storage unit of the DSN, wherein the nth modification is transmitted in a separate message from both the first modification and the second modification.

17. The storage unit of claim 12, wherein at least one of the first modification and the second modification is in accordance with a protocol that specifies an N-Element compare and swap (CAS-N) operation.

18. The storage unit of claim 17, wherein the CAS-N operation is at least one of propose, promote and cleanup.

19. The storage unit of claim 17, wherein the CAS-N operation comprises changing a state of the EDS from a first state to a second state.

* * * * *